(12) United States Patent
Gonnet

(10) Patent No.: US 12,358,192 B2
(45) Date of Patent: Jul. 15, 2025

(54) DEVICE AND METHOD FOR OVERMOULDING A GLAZING AND AN INSERT, AND INSERT USED BY SAID DEVICE AND SAID METHOD

(71) Applicant: SAINT-GOBAIN GLASS FRANCE, Courbevoie (FR)

(72) Inventor: Romain Gonnet, Lacroix Saint Ouen (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 407 days.

(21) Appl. No.: 17/290,093

(22) PCT Filed: Oct. 23, 2019

(86) PCT No.: PCT/FR2019/052525
§ 371 (c)(1),
(2) Date: Apr. 29, 2021

(87) PCT Pub. No.: WO2020/089546
PCT Pub. Date: May 7, 2020

(65) Prior Publication Data
US 2021/0394409 A1   Dec. 23, 2021

(30) Foreign Application Priority Data
Oct. 31, 2018 (FR) .................................... 1860068

(51) Int. Cl.
*B29C 45/14* (2006.01)
*B29C 45/33* (2006.01)
(Continued)

(52) U.S. Cl.
CPC .. *B29C 45/14377* (2013.01); *B29C 45/14065* (2013.01); *B29C 45/14434* (2013.01);
(Continued)

(58) Field of Classification Search
CPC .......................... B29C 45/14377; B60J 10/78
See application file for complete search history.

(56) References Cited

U.S. PATENT DOCUMENTS

| | | | | |
|---|---|---|---|---|
| 4,132,044 A | * | 1/1979 | Rollyson | ................... E06B 3/58 |
| | | | | 52/775 |
| 5,028,226 A | | 7/1991 | De'ath et al. | |

(Continued)

FOREIGN PATENT DOCUMENTS

| CA | 2157201 | * | 2/2000 |
|---|---|---|---|
| CA | 2759632 | * | 6/2012 |

(Continued)

OTHER PUBLICATIONS

International Search Report as issued in International Patent Application No. PCT/FR2019/052525, dated Jan. 28, 2020.
(Continued)

*Primary Examiner* — Edmund H Lee
(74) *Attorney, Agent, or Firm* — Pillsbury Winthrop Shaw Pittman LLP

(57) ABSTRACT

An assembly is formed by an insert and an overmolding device including a lower mold part and an upper mold part that are movable with respect to one another between an open position, which is suitable for the arrangement and removal of a glass pane and of the insert to be overmolded, and a closed position, in which the two mold parts delimit at least one cavity for injection of the overmolding material, wherein the lower part includes a receiving housing that is designed, on account of having a complementary shape to a referencing member of the insert, to form a stop for the member in a direction of insertion of the insert, and to immobilize the member along a vertical axis.

12 Claims, 3 Drawing Sheets

Figure 1:
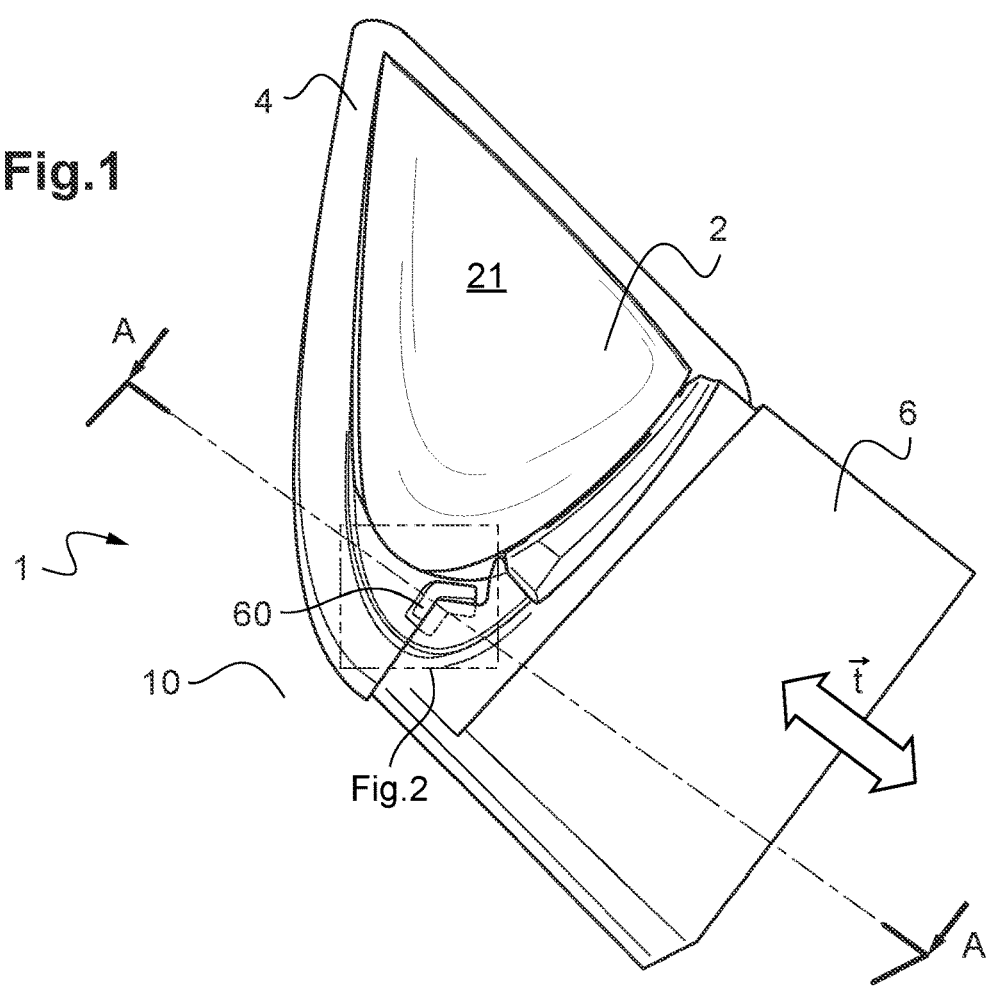

(51) Int. Cl.
   *B29C 45/36*    (2006.01)
   *B60J 10/78*    (2016.01)
(52) U.S. Cl.
   CPC .............. *B29C 45/33* (2013.01); *B29C 45/36*
         (2013.01); *B29C 2045/14459* (2013.01); *B60J*
                                        *10/78* (2016.02)

(56) References Cited

U.S. PATENT DOCUMENTS

| | | | |
|---|---|---|---|
| 5,702,148 A * | 12/1997 | Vaughan | B60J 10/78 49/490.1 |
| 2004/0031203 A1 | 2/2004 | Russell et al. | |
| 2005/0042418 A1 | 2/2005 | Hui et al. | |
| 2010/0247951 A1 * | 9/2010 | Fukushima | B29C 45/14377 264/261 |
| 2015/0093186 A1 * | 4/2015 | Nabuurs | B29C 45/14377 403/267 |
| 2015/0357888 A1 * | 12/2015 | Houzumi | H01B 3/30 264/272.14 |
| 2017/0291338 A1 | 10/2017 | Kamiya | |

FOREIGN PATENT DOCUMENTS

| | | | |
|---|---|---|---|
| CN | 104647683 | * | 5/2015 |
| CN | 105729723 | * | 7/2016 |
| CN | 107073772 A | | 8/2017 |
| CN | 108115890 | * | 6/2018 |
| EP | 0073350 | * | 3/1983 |
| EP | 0436438 | * | 7/1991 |
| FR | 2932127 | * | 12/2009 |
| JP | H01-197114 A | | 8/1989 |
| JP | 03019817 | * | 1/1991 |
| JP | 2000-351134 A | | 12/2000 |
| JP | 2002-292681 A | | 10/2002 |
| JP | 2003-011157 A | | 1/2003 |
| JP | 3581307 | * | 10/2004 |
| JP | 2016-179590 A | | 10/2016 |
| KR | 20060087081 | * | 8/2006 |
| WO | WO 2017/132382 A1 | | 8/2017 |

OTHER PUBLICATIONS

Notice of Reasons for Refusal as issued in Japanese Patent Application No. 2021-521368, dated Aug. 8, 2023.
First Office Action as issued in Chinese Patent Application No. 201980004820.9, dated Jun. 9, 2021.
Hearing Notice issued in Indian Patent Application No. 202117017350, dated Oct. 25, 2023.

* cited by examiner

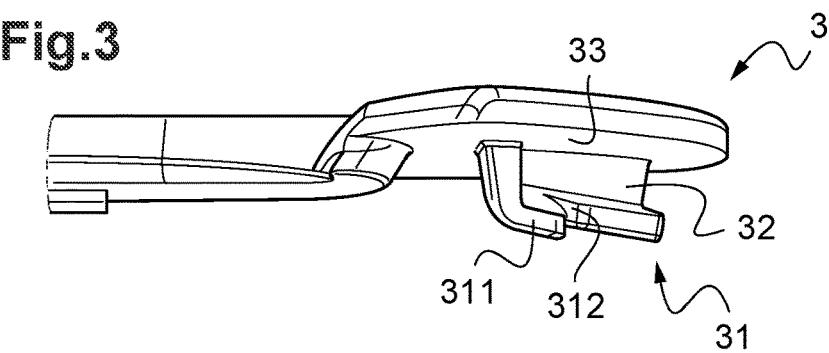
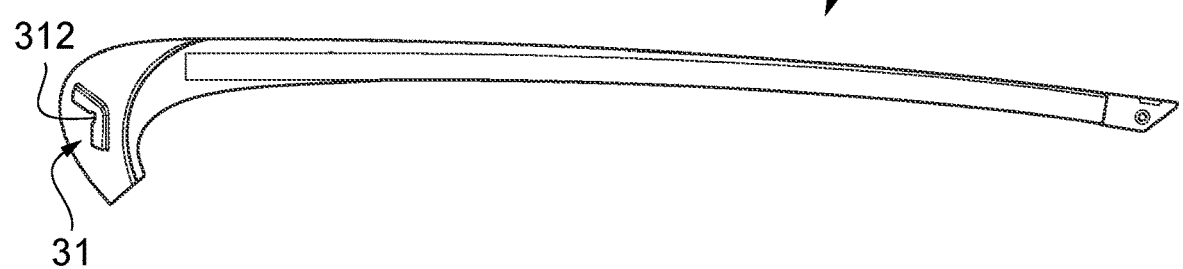
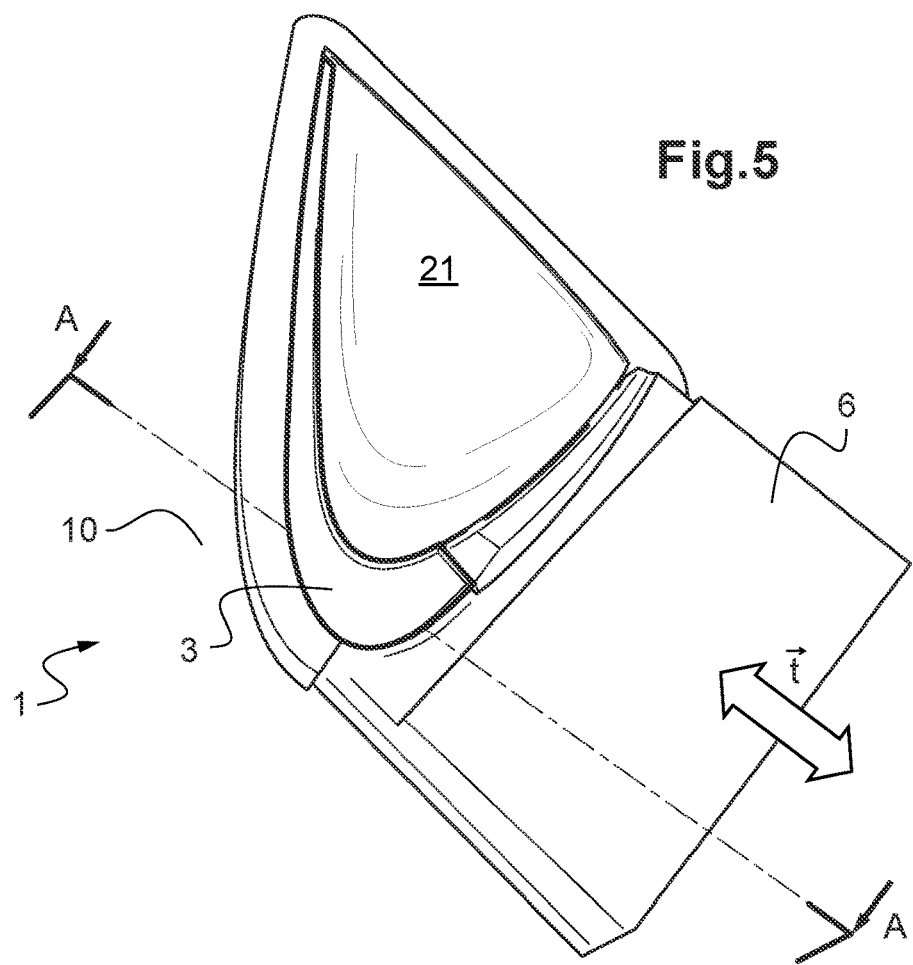

DEVICE AND METHOD FOR OVERMOULDING A GLAZING AND AN INSERT, AND INSERT USED BY SAID DEVICE AND SAID METHOD

CROSS-REFERENCE TO RELATED APPLICATIONS

This application is the U.S. National Stage of PCT/FR2019/052525, filed Oct. 23, 2019, which in turn claims priority to French patent application number 1860068 filed Oct. 31, 2018. The content of these applications are incorporated herein by reference in their entireties.

The invention relates to a device and a process for encapsulating a glass pane and an associated insert, and to an insert suitable for implementing said device and said process. Moreover, the invention relates to the overmolded assembly obtained by the implementation of this process.

The encapsulation of a glass pane consists in joining a polymer seal or some other polymeric element, usually a thermoplastic elastomer (TPE) or polyvinyl chloride (PVC), to the peripheral border of a glass pane. The glass pane is often joined, at the edge or close to the edge of the glass pane, to at least one insert that can either form a filler piece so as to replace a certain thickness of polymeric material in order to ensure complete and uniform injection of the plastics material, or form a support piece intended to serve as a base for fastening to an accessory in the subsequent use of the glazing unit.

The encapsulation phase is obtained by injecting the plastics material into a mold of suitable shape in which the glass pane has been placed. Since the injection of material tends to move the insert, it is appropriate for the insert to be kept perfectly in position during the injection phase.

In order to ensure that the insert is kept in position, it is known to employ an overmolding device comprising a lower mold part and an upper mold part that are movable with respect to one another between an open position, which is suitable for the arrangement and removal of a glass pane and of an insert to be overmolded, and a closed position, in which the two mold parts delimit at least one cavity intended to receive a glass pane and an insert to be overmolded. Traditionally, the lower mold part comprises five retractable pins distributed around its inner perimeter, which are designed to be inserted into corresponding orifices made in the sides of the insert to be overmolded. In practice, the overmolding process employing this device and the associated insert comprises the following sequence of steps:
  the glass pane is first of all attached to the lower part of the mold, then
  the insert to be overmolded is positioned very precisely by an operator and held on the lower part of the mold, such that each of the five orifices made in the sides of the insert is perfectly aligned with the respective paths of the five holding pins of the mold,
  the five pins are then extended so as to pass into said orifices, in order to immobilize the insert on the mold,
  the device is closed, and the polymeric overmolding material is injected, and then
  the pins are retracted so as to allow the ejection of the insert during the opening of the device.

Such an overmolding device and the associated process have numerous drawbacks. Firstly, it is difficult for the operator to position the insert, since the five pins have to be introduced simultaneously into the five orifices distributed around the sides of the insert. Given the need for the insert to be perfectly immobilized during the injection of the overmolding material, at least in a vertical direction, the tolerances permitted between the diameter of each of the pins of the mold and the diameter of the orifice corresponding thereto in the insert are very tight. Moreover, it may prove difficult to precisely anticipate the extension path of the pins, thereby increasing the complexity of the phase of positioning and holding of the insert by the operator. In the event of poor alignment, the risk of one or more pins breaking is high. If necessary, repairing the mold may prove to be time-consuming, expensive and technically complex. Even when the insert is positioned correctly, other drawbacks remain, which are inherent to the technique. Thus, the time for positioning the insert is necessarily long, greater than 10 seconds, even when carried out by an experienced operator. The rapid extension and retraction of the pins also involve the risk of the operator's fingers being trapped. Finally, it is impossible to overmold plastics material on the pins, and so the housings for receiving the latter remain visible at the end of the overmolding process. This is an additional drawback that affects both the appearance and the compactness of the overmolded insert.

The invention aims to remedy at least some of the abovementioned drawbacks and, according to one particular embodiment, relates to an assembly formed by an insert and an overmolding device comprising a lower mold part and an upper mold part that are movable with respect to one another between:
  an open position, which is suitable for the arrangement and removal of a glass pane and of the insert to be overmolded, and
  a closed position, in which the two mold parts delimit at least one cavity for injection of the overmolding material,
said device being characterized in that the lower part comprises a receiving housing that is designed, on account of having a complementary shape to a referencing member of the insert, to form a stop for said member in a direction of insertion of the insert, and to immobilize said member along a vertical axis.

Throughout the text, the stop function of the receiving housing relates to the ability thereof to stop the movement of the insert during the insertion thereof. More specifically, a referencing member of the insert has a geometry complementary to at least one portion of the receiving housing, so as to be able to come into abutment with the latter and thus to stop the travel of the insert during the insertion thereof. This referencing member thus allows the insert to be positioned quickly and easily with respect to the glass pane and to the mold, ensuring that the insert is indexed in the overmolding frame of reference. Following its insertion into the receiving housing, the referencing member of the insert is immobilized therein along a vertical axis. In other words, the receiving housing then prevents any movement of the referencing member on the closing plane of the mold. This feature ensures in particular that the insert is held securely during the subsequent step of injecting the overmolding plastics material, the resultant of the pressure loads generated during the injection being exerted mainly along a vertical axis. In the context of an assembly according to the invention, the risks of breakage, which were previously concentrated on the pins of the mold, are considerably reduced, and are concentrated mainly on the referencing member of the insert, which is an easily replaceable piece. The maintenance of the overmolding device is thus easier. Finally, after overmolding, the only part of the insert that will inevitably have to remain visible is its referencing member, the other portions being able to be completely overmolded as desired. It may thus be easier to arrange the overmolded assembly on a given structure, for example within a motor vehicle door.

According to one particular embodiment, the receiving housing comprises an overhang, which at least partially delimits a receiving space for said referencing member of the insert. Such an overhang makes it possible in particular to immobilize the referencing member of the insert in a vertical direction.

According to one particular embodiment, said referencing member comprises an overhang, which protrudes over an abutment surface of the insert with said lower mold part and has a complementary shape to the housing of the lower mold part. Such an overhang makes it easier in particular to insert the referencing member of the insert into said receiving housing and to keep it therein.

According to one particular embodiment, the overhang of said housing (60) and/or the overhang (311) of said referencing member (31) comprises a chamfered profile. The tapered shape of one and/or the other of said overhangs, such that the latter have a negative slope from the inside to the outside of said housing/member, makes it easier to insert the referencing member into the housing and to extract it therefrom after overmolding.

According to particular embodiments, the chamfered profile of at least one of said overhangs also allows the overhang of the housing to form a stop for the referencing member in the direction of insertion thereof.

According to one particular embodiment, the overhang of said housing and/or the overhang of said member has a V-shaped cross section in top view.

Throughout the text, the cross section in top view of the overhang of said housing describes the shape of the latter when considered along the normal to the plane of closure of the device. The cross section in top view of the overhang of the referencing member of the insert describes the shape of the latter when considered along the normal to the plane of abutment of the insert with the lower part of the device. This V shape gives said overhang two contact surfaces that extend in directions that are not aligned, making it easier to insert the referencing member into the housing and to extract it therefrom after overmolding.

According to one particular embodiment, the hollow on the inside of the V of the overhang of the referencing member has a concave cutout in the form of a circular arc. Such a cutout allows an operator to have a degree of angular movement of the insert in a horizontal plane. This makes it easier to insert the insert.

According to one particular embodiment, the overhang of the referencing member is secured to the rest of the insert by peripheral fasteners, which are preferably breakable.

According to one particular embodiment, these fasteners connect the base of the referencing member to the part of its overhang that is intended to be farthest from the receiving housing.

According to one particular embodiment, the internal surface of these fasteners forms a stop for the overhang of the receiving housing.

According to one particular embodiment, the fasteners can be breakable or, in other words, have technical solutions that make it easier to cut them, for example via the localized narrowing of their thickness along a cut line. Given that after overmolding, the fasteners and the overhang of the referencing member necessarily remain visible, the breakable nature of these fasteners makes the subsequent separation effected between the referencing member and the rest of the overmolded assembly easier.

According to one particular embodiment, said housing is partially made up of a slide system that is movable in translation between:
- an advanced position, in which said housing is designed to form a stop for said member in a direction of insertion of the insert and to immobilize this member along a vertical axis, and
- a retracted position, which is designed to allow the referencing member to be released in a vertical direction.

The employment of such a slide system makes it easier to eject the insert after overmolding, the removal of the insert being able to be carried out vertically when the slide system is in its retracted position.

According to one particular embodiment, the slide system comprises a piece that is movable in translation and integrates in particular the overhang of the receiving housing, such that in the advanced position, this overhang forms a stop for the referencing member at the same time as immobilizing the latter along a vertical axis, and such that in the retracted position, this overhang is set back so as to release the referencing member of the insert.

According to one particular embodiment, said housing is made in a recess formed in said lower part of the mold. In the absence of a part flush with the surface of the mold, this recess is rendered more robust and also more compact.

According to one particular embodiment, the invention also relates to a device for overmolding a glass pane and at least one insert intended to be part of an assembly such as the one described above, said device comprising a lower mold part and an upper mold part that are movable with respect to one another between:
- an open position, which is suitable for the arrangement and removal of a glass pane and of the insert to be overmolded, and
- a closed position, in which the two mold parts delimit at least one cavity for injection of the overmolding material, said device being characterized in that the lower part comprises a housing that is designed, on account of having a complementary shape to a referencing member of the insert, to form a stop for said member in a direction of insertion, and to immobilize said member along a vertical axis.

According to one particular embodiment, the invention also relates to an insert intended to be part of an assembly such as the one described above, said insert being intended to be secured to a glass pane after overmolding in a device comprising a lower mold part and an upper mold part that are movable with respect to one another between
- an open position, which is suitable for the arrangement and removal of the glass pane and of the insert to be overmolded, and
- a closed position, in which the two mold parts delimit at least one cavity for injection of the overmolding material, said insert being characterized in that it comprises a referencing member that is designed, on account of having a complementary shape to a housing of said lower mold part, to come into abutment in said housing in a direction of insertion of the insert, and to be immobilized therein along a vertical axis.

According to one particular embodiment, the invention also relates to an overmolding process employing an assembly such as the one described above, comprising at least the following steps of:
- positioning the glass pane on the lower mold part of the device in the open position, fitting the insert by arranging the referencing member in the housing of the lower mold part, and optionally attaching, preferably securing by adhesive bonding, a portion of the insert to the glass pane, closing the device and injecting overmolding material, opening the device in order to eject the overmolded assembly comprising the insert and the glass pane.

According to one particular embodiment, this process employs a slide system such as the one described above, which is initially in its advanced position, and is shifted into its retracted position following the injection of the polymeric overmolding material. As already described in the present text, this feature makes it easier to eject the insert after overmolding.

According to one particular embodiment, the invention also relates to an overmolded assembly obtained by implementing such a process. Such an overmolded assembly differs from the encapsulations that already exist in that the referencing member remains visible after overmolding. On the other hand, it is not necessary to provide pin inlets in the perimeter of the overmolded insert.

According to one particular embodiment, the invention also relates to the use of such an overmolded assembly as a glazing unit of a motor vehicle. According to this particular embodiment, the overmolded assembly is thus suitable for employment in a motor vehicle, in particular on account of its weight, its dimensions and its compactness.

The present invention will now be described with the aid of purely illustrative examples that in no way limit the scope of the invention, and on the basis of the appended illustrations, in which:

FIG. 1 shows a schematic top view of the lower part 10 of the device, on which a glass pane 2 is arranged. The lower part 10 is notably equipped with a slide system comprising a movable retaining piece, in the advanced position.

Figure 2:
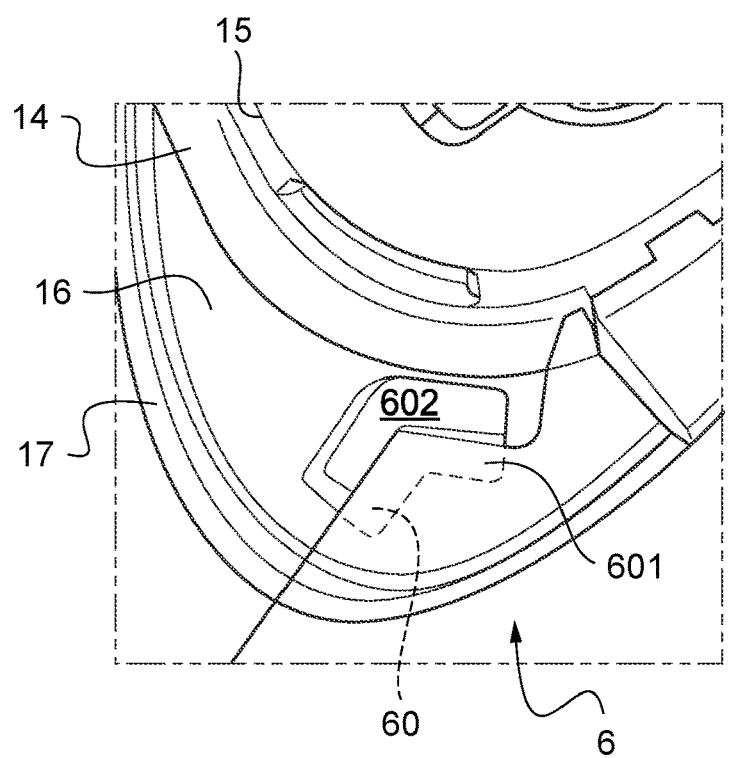

FIG. 2 is a detail view of FIG. 1 in the region of the receiving housing 60 for the insert 3.

FIG. 3 is a frontal view of the bottom of the insert 3, which is intended to face the lower part 10 of the device 1 and of the glass pane 2.

FIG. 4 is a perspective view of the referencing member 31 of the insert 2, which is intended to cooperate with the receiving housing 60 in the lower part 10 of the device.

FIG. 5 differs from FIG. 1 in that an insert 3 is mounted on the device 1.

Figure 6:
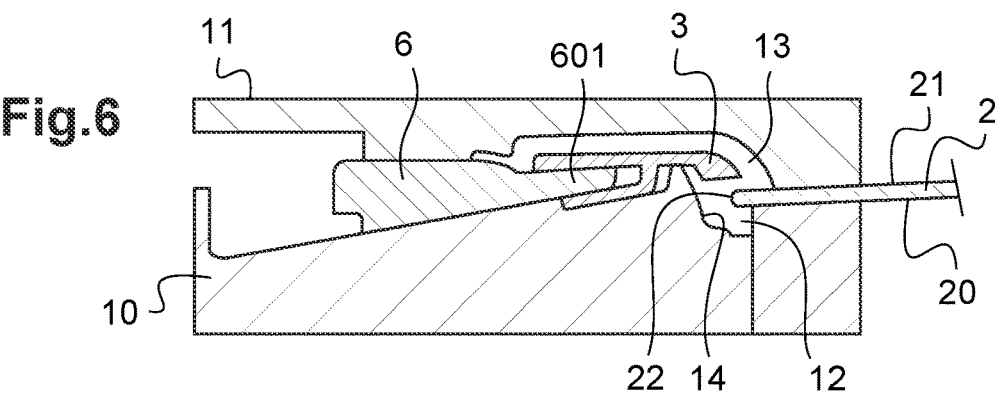

FIG. 6 is a view in section on the section plane A-A in FIG. 1, except that the device is in the closed position. The piece 60a is in its advanced position.

Figure 7:
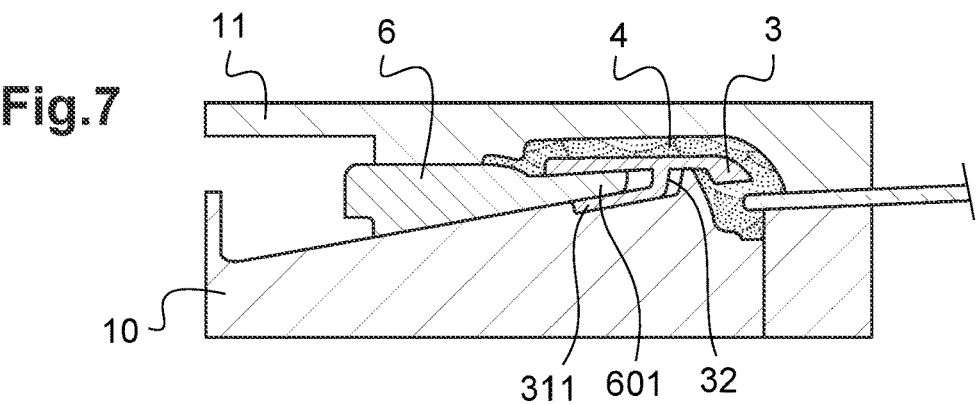

FIG. 7 differs from FIG. 6 in that the polymeric overmolding material has been injected.

Figure 8:
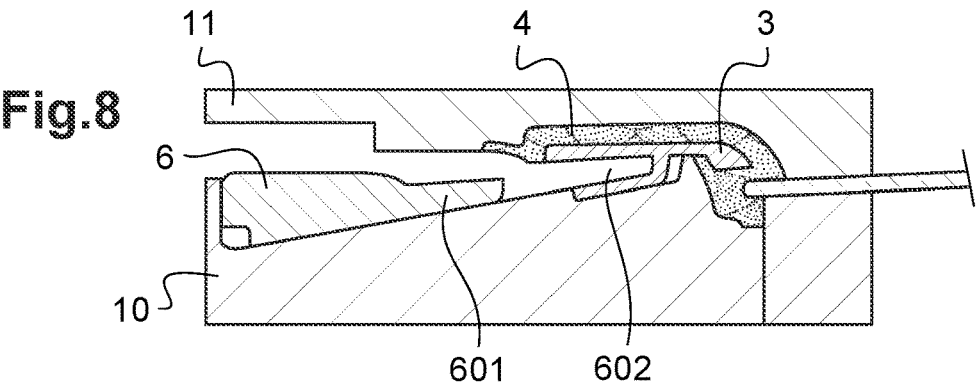

FIG. 8 differs from FIG. 7 in that the piece 60a is in its retracted position.

Figure 9:
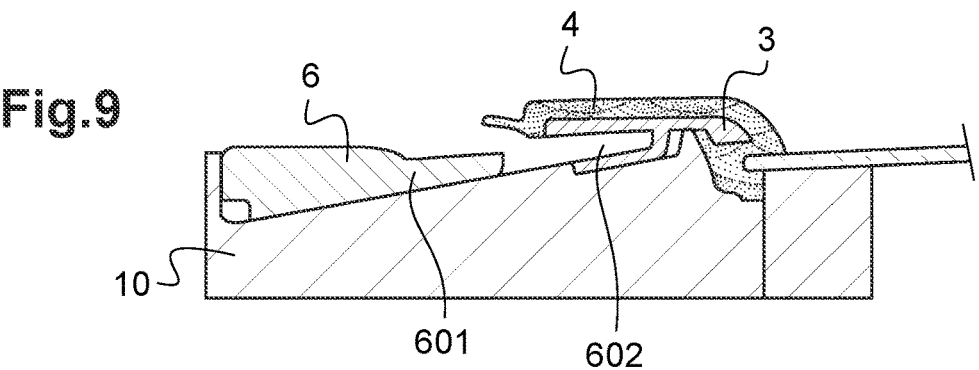

FIG. 9 differs from FIG. 8 in that the device 1 is in its open position and ready for the ejection of the assembly formed by the overmolded glass pane and the insert.

Throughout the text, the qualifiers "upper" and "lower" in relation to an element of the overmolding device, of the insert or of the glass pane are used in the context of a normal installation of the device such that the closure plane of the device is in a horizontal plane, as is the glass pane.

The aim of the overmolding device 1 of the invention is to encapsulate a glass pane 2. As illustrated in FIG. 1, the encapsulation is preferably around the entire periphery of the glass pane 2, in the form of a polymeric seal 4 in which an insert 3 is overmolded and thus secured to the glass pane 2. The insert 3 has the form illustrated in FIGS. 3 and 4. This form of the insert is not limiting, however.

The overmolding device 1 comprises a lower mold part 10 and an upper mold part 11 that is movable with respect to the lower part 10, the two parts 10 and 11 delimiting respective cavities 12 and 13 (FIG. 6) in which the glass pane 2 and the insert 3 are intended to be installed and which provide the volume suitable for the injection of polymeric material 4 for encapsulating the glass pane and the insert, as can be seen on the finished overmolded product in FIG. 10.

The glass pane 2 has two opposite main faces 20 and 21 that are connected by the edge 22. The glass pane is positioned flat in the device. The geometry of the glass pane 2 illustrated in FIGS. 1 and 2 is given by way of nonlimiting example.

The cavity 12 also has a suitable geometry as regards the form of the insert 3 and the form of the polymeric encapsulating seal 4 of the insert. With reference to FIGS. 1, 2 and 6, the cavity 12 in the fixed part 10 intended to accommodate the referencing member 31 of the insert 3 is notably delimited by:

a peripheral wall known as the lower peripheral wall 14, which descends toward the inside of the fixed part 10 in an opposite direction to the movable part 11, as far as a bottom 15, so as to ensure encapsulation of the two opposite main faces 20 and 21 and of the edge 22 of the glass pane 2;

a lateral flat 16, which is arranged above the peripheral wall 14 and limited in area in order to accommodate the referencing member 31 of the insert 3; and an upper wall of the cavity 12, known as end wall 17, which follows the contour of the flat 16 on the opposite side from the wall 14 and delimits the outermost peripheral part of the cavity 12.

As illustrated in FIGS. 1 and 2, the lower part 10 comprises a receiving housing 60 that is designed, on account of having a complementary shape to a referencing member 31 of the insert 3 (illustrated in FIGS. 3 to 9), to form a stop for said member 31 in a direction of insertion of the insert 3, and to immobilize said member 31 along a vertical axis. More specifically, this housing 60 is made in a recess formed in said lower mold part 10 and comprises an overhang 601, which at least partially delimits a receiving space 602 for said referencing member 31 of the insert 3. Such an overhang 601 makes it possible in particular to immobilize the referencing member of the insert in a vertical direction. The overhang 601, like the receiving space 602, has a V-shaped cross section in top view. Note that in FIGS. 1 and 2 a first region of the receiving space 602 is uncovered and visible, while a second region is overhung by the overhang 601 and is delimited by dashed lines in FIG. 2.

As illustrated in FIGS. 1, 2 and 5 to 9, the overmolding device 1 is equipped with a slide system 6, which comprises in particular a piece that is movable in translation in a direction t, which integrates the overhang 601 of the receiving housing 60 such that, in the advanced position, this overhang forms a stop for the referencing member 31 at the same time as immobilizing the latter along a vertical axis, and such that, in the retracted position, this overhang 601 is set back so as to release the referencing member 31 of the insert 3. The employment of such a slide system makes it easier to eject the insert after overmolding, the removal of the insert 3 being able to be carried out vertically when the slide system 6 is in its retracted position.

FIGS. 3 and 4 are schematic depictions of an insert 3 according to one particular embodiment of the invention. Such an insert 3 is intended to be secured to a glass pane 2 after overmolding in a device 1 such as the one described above. In particular, this insert 3 comprises a referencing member 31 that is designed, on account of having a complementary shape to the housing 60 of the lower mold part 10, to come into abutment in said housing 60 in a direction of insertion of the insert, and to be immobilized therein along a vertical axis, as illustrated in FIGS. 6 and 7.

More specifically, the referencing member 31 comprises an overhang 311, which protrudes over an abutment surface 33 of the insert 3 with said lower mold part 10 and has a complementary shape to the housing 60 of the lower mold part 10, as illustrated in FIGS. 6 and 7. The overhang 311 of the referencing member 31 is secured to the rest of the insert 3 by peripheral fasteners 32. The assembly formed by the overhang 311, the fasteners 32 and the abutment surface 33 of the insert 3 delimits a receiving space 602 (see FIGS. 8 and 9) for the referencing member 31 of the insert 3. Such an overhang 311 makes it possible in particular to immobilize the referencing member 31 of the insert 3 in a vertical direction.

As illustrated in FIGS. 3 and 4, the overhang 311 of the referencing member 31 has a V-shaped cross section in top view. This V shape gives this overhang 311 two contact surfaces that extend in directions that are not aligned, thereby making it easier to insert the referencing member into the housing and to extract it therefrom after overmolding. The hollow on the inside of the V of the overhang 311 of the referencing member 31 has a concave cutout 312 in the form of a circular arc, which allows an operator to have a degree of angular movement of the insert 3 in a horizontal plane. This makes it easier to insert the insert 3.

As illustrated in FIGS. 6 to 9, the overhang 601 of the housing 60 and the overhang 311 of the referencing member 31 both comprise a chamfered profile, thereby making it easier to insert the referencing member 31 into the housing 60 and to extract it therefrom after overmolding. These chamfered profiles also allow the overhang 601 of the housing 60 to form a stop for the referencing member 31 in the direction of insertion thereof. In this configuration, illustrated in FIGS. 6 and 9, the overhang 601 of the housing 60 is not brought into contact with the inner part of the peripheral fasteners 32 of the referencing member 3, and so these fasteners 32 only have a function of mechanically connecting the surface of the abutment surface 33 and the overhang 311 of the insert 3.

In this context, the extent of the fasteners 32 can be limited to the bare minimum for ensuring this function. For example, and according to one particular embodiment that is not shown in the figures, the overhang 601 may be linked to the abutment surface 33 of the referencing member 3 only by two fasteners positioned at the ends of the arms of the V shape. If necessary, these fasteners 32 would be more easily breakable.

The rest of the description describes in more detail the sequence of steps of an overmolding process according to one particular embodiment of the invention, which employs in particular an overmolding device 1 and an insert 3 as were described above.

In the initial state, the overmolding device 1 is in its open position, and the slide system 6 is in its advanced position. A glass pane 2 is positioned on the lower mold part 10.

During a first step, the referencing member 31 of the insert 3 is mounted in the housing 60 of the lower part 10 of the device 1. This referencing member 31 therefore allows the insert 3 to be positioned quickly and easily with respect to the glass pane 2 and to the lower part 10 of the mold 1, ensuring that the insert is indexed in the overmolding frame of reference. According to one particular embodiment, a longitudinal portion of the insert 3 is at the same time attached and bonded, for example by means of an adhesive tape, to the upper face 21 of the glass pane. The upper part 11 of the device 1 is then shifted into the closed position, as illustrated in FIG. 6.

Once the device 1 is in its closed position, the polymeric overmolding material 4 is injected under high pressure into the cavities 12 and 13, as illustrated in FIG. 7. During this step, the immobilization of the referencing member 31 in the housing 60 allows the insert 3 to be held securely, the resultant of the pressure loads generated during the injection being exerted mainly along a vertical axis.

Following the injection of the overmolding material 4, and before the device 1 is opened, the slide system 6 is shifted into its retracted position, by a movable piece being moved in translation. In this configuration, and as illustrated in FIG. 8, the insert 3 can be removed vertically, thereby making it easier to eject the insert 3 after overmolding.

During a subsequent step, and as illustrated in FIG. 9, the device 1 is opened. The overmolded assembly comprising the overmolded insert 3 and glass pane 2 can then be ejected from the mold 1. This overmolded assembly that is thus obtained differs from the encapsulations that already exist in that the referencing member 31 remains visible after overmolding.

The slide system 6 is then shifted back into its advanced position, by the piece 60 being moved in translation, in order to repeat the overmolding process.

According to one particular embodiment, the invention also relates to the use of such an overmolded assembly as a glazing unit of a motor vehicle.

The invention claimed is:

1. An assembly comprising:
an insert and an overmolding device comprising a lower mold part and an upper mold part that are movable with respect to one another between:
an open position, which is suitable for the arrangement and removal of a glass pane and of the insert to be overmolded, and
a closed position, in which the lower and upper mold parts delimit at least one cavity for injection of the overmolding material,
wherein the lower mold part comprises a receiving housing that is adapted, on account of having a complementary shape to a referencing member of the insert, to form a stop for said referencing member in a direction of insertion of the insert, and to immobilize said referencing member along an axis oriented toward the upper mold part,
wherein said referencing member comprises an overhang, which protrudes over an abutment surface of the insert with said lower mold part and has a complementary shape to the receiving housing of the lower mold part.

2. The assembly as claimed in claim 1, wherein said receiving housing comprises an overhang, which at least partially delimits a receiving space for said referencing member of the insert.

3. The assembly as claimed in claim 2, wherein the overhang of said receiving housing and/or the overhang of said referencing member comprises a chamfered profile.

4. The assembly as claimed in claim 2, wherein the overhang of said receiving housing and/or the overhang of said referencing member has a V-shaped cross section in top view.

5. The assembly as claimed in claim 1, wherein the overhang of said receiving housing and/or the overhang of said referencing member has a V-shaped cross section in top view, and wherein the hollow on the inside of the V of the overhang of the referencing member has a concave cutout in the form of a circular arc.

6. The assembly as claimed in claim 1, wherein the overhang of said receiving housing and/or the overhang of said referencing member has a V-shaped cross section in top view, and wherein the overhang of the referencing member is secured to the rest of the insert by peripheral fasteners.

7. The assembly as claimed in claim 6, wherein the peripheral fasteners are breakable.

8. An assembly, comprising:
an insert and an overmolding device comprising a lower mold part and an upper mold part that are movable with respect to one another between:
  an open position, which is suitable for the arrangement and removal of a glass pane and of the insert to be overmolded, and
  a closed position, in which the lower and upper mold parts delimit at least one cavity for injection of the overmolding material,
wherein the lower mold part comprises a receiving housing that is adapted, on account of having a complementary shape to a referencing member of the insert, to form a stop for said referencing member in a direction of insertion of the insert, and to immobilize said referencing member along an axis oriented toward the upper mold part,
wherein said receiving housing is partially made up of a slide system comprising a movable piece that is movable in translation between:
  an advanced position, in which said movable piece is adapted to form a stop for said referencing member in a direction of insertion of the insert and to immobilize said referencing member along said axis oriented toward the upper mold part and in which the movable piece is in direct contact with the lower mold part and the upper mold part, and
  a retracted position, which is adapted to allow the referencing member to be released in a direction oriented toward the upper mold part.

9. The assembly as claimed in claim 1, wherein said receiving housing is made in a recess formed in said lower part of the mold.

10. An overmolding process employing an assembly including an insert and an overmolding device comprising a lower mold part and an upper mold part that are movable with respect to one another between:
  an open position, which is suitable for the arrangement and removal of a glass pane and of the insert to be overmolded, and
  a closed position, in which the lower and upper mold parts delimit at least one cavity for injection of the overmolding material,
wherein the lower mold part comprises a receiving housing that is adapted, on account of having a complementary shape to a referencing member of the insert, to form a stop for said referencing member in a direction of insertion of the insert, and to immobilize said referencing member along an axis oriented toward the upper mold part,
wherein said referencing member comprises an overhang, which protrudes over an abutment surface of the insert with said lower mold part and has a complementary shape to the receiving housing of the lower mold part,
the overmolding process comprising:
  positioning the glass pane on the lower mold part of the device in the open position,
  fitting the insert by arranging the referencing member in the receiving housing of the lower mold part, and optionally attaching a portion of the insert to the glass pane,
  closing the device and injecting overmolding material,
  opening the device in order to eject the overmolded assembly comprising the insert and the glass pane.

11. The overmolding process as claimed in claim 10, wherein said receiving housing is partially made up of a slide system that is movable in translation between:
  an advanced position, in which said receiving housing is adapted to form a stop for said referencing member in a direction of insertion of the insert and to immobilize said referencing member along a vertical axis, and
  a retracted position, which is adapted to allow the referencing member to be released in a vertical direction, and
wherein the slide system is initially in its advanced position, and is shifted into its retracted position following the injection of the polymeric overmolding material.

12. The overmolding process as claimed in claim 10, wherein the portion of the insert is secured to the glass pane by adhesive bonding.

* * * * *